(12) United States Patent
Whitner

(10) Patent No.: US 10,372,542 B2
(45) Date of Patent: Aug. 6, 2019

(54) FAULT TOLERANT EVENT MANAGEMENT SYSTEM

(71) Applicant: CA, Inc., New York, NY (US)

(72) Inventor: Richard Bennett Whitner, Fort Collins, CO (US)

(73) Assignee: CA, Inc., New York, NY (US)

( * ) Notice: Subject to any disclaimer, the term of this patent is extended or adjusted under 35 U.S.C. 154(b) by 424 days.

(21) Appl. No.: 14/868,184

(22) Filed: Sep. 28, 2015

(65) Prior Publication Data

US 2017/0091038 A1 Mar. 30, 2017

(51) Int. Cl.
*G06F 11/14* (2006.01)

(52) U.S. Cl.
CPC .... *G06F 11/1402* (2013.01); *G06F 2201/805* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,131,112 A | * | 10/2000 | Lewis | H04L 41/042 709/207 |
| 2004/0010647 A1 | * | 1/2004 | Chheda | G06F 13/24 710/260 |
| 2007/0283364 A1 | | 12/2007 | Deininger | |
| 2010/0188051 A1 | * | 7/2010 | Yamazaki | H02J 7/0072 320/148 |
| 2013/0179729 A1 | * | 7/2013 | Chiu | G06F 12/16 714/19 |
| 2013/0226877 A1 | * | 8/2013 | Nagai | G06F 17/30002 707/687 |

OTHER PUBLICATIONS

CA, "Inside Event Management and Alert Management", CA, Inc., "Inside Event Management and Alert Management", https://support.ca.com/cadocs/0/CA%20Workload%20Automation%20AE%20Release%2011%203%206%20-%20Public%20Access-ENU/Bookshelf_Files/PDF/NSM_InsideEvent_ENU.pdf, as visited on Sep. 28, 2015, 2010, 228 pages.

* cited by examiner

*Primary Examiner* — Amine Riad
(74) *Attorney, Agent, or Firm* — Gilliam IP PLLC

(57) ABSTRACT

If an event management system or component within an event management system fails, events generated by systems and applications monitored by the event management system may not be processed or analyzed. As a result, the performance and health of the systems and applications may be unknown. To reduce the impact of a failure, an event management system can include at least two event managers: a primary event manager and one or more standby event managers. The standby event managers are configured to handle event processing tasks upon a failure of the primary event manager. To be prepared for a failure of the primary event manager, the standby event manager receives state data and copies of events. After determining that the primary event manager has failed, the standby event manager can begin processing events.

20 Claims, 4 Drawing Sheets

FAULT TOLERANT EVENT MANAGEMENT SYSTEM

BACKGROUND

The disclosure generally relates to the field of computer systems, and more particularly to event management systems.

Events are generated by a variety of sources or components, including hardware and software. Events include messages that can indicate numerous activities, such as an application finishing a task or a server failure. An event management system collects and processes events generated by components. For example, an event management system may distribute events to network monitoring applications, trigger alerts based on events, assign events to an administrator, filter and consolidate events, etc.

BRIEF DESCRIPTION OF THE DRAWINGS

Embodiments of the disclosure may be better understood by referencing the accompanying drawings.

DESCRIPTION

Figure 1:
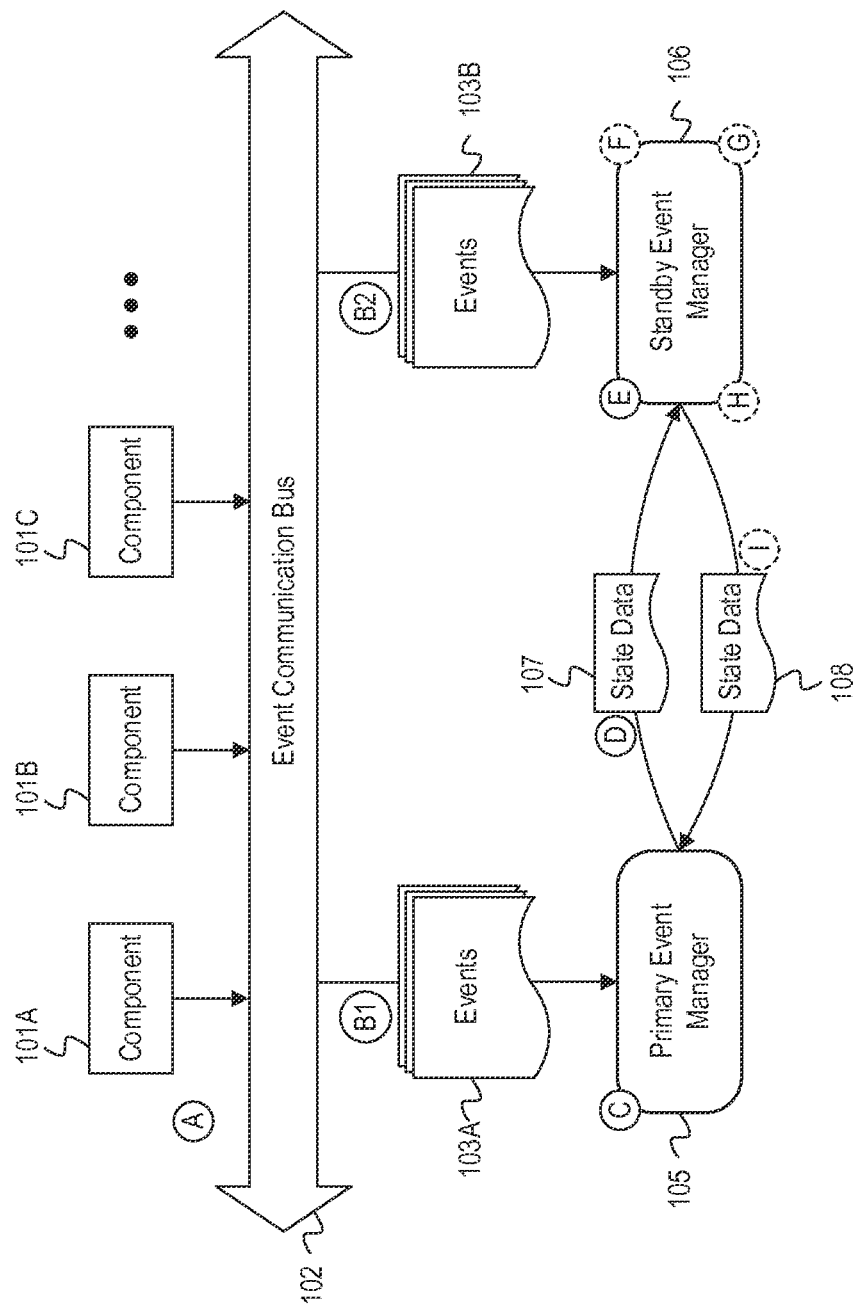
FIG. 1 depicts an example fault tolerant event management system including a primary event manager that synchronizes state data with a standby event manager.

The description that follows includes example systems, methods, techniques, and program flows that embody aspects of the disclosure. However, it is understood that this disclosure may be practiced without these specific details. For instance, this disclosure refers to events generated by components of a network in illustrative examples. But aspects of this disclosure can be applied to events generated by components within a local system, such as components of a storage device. In other instances, well-known instruction instances, protocols, structures and techniques have not been shown in detail in order not to obfuscate the description.

TERMINOLOGY

The description below uses the term "events" to refer to data generated by components. An event indicates an occurrence at a component at a point in time. For example, an event may indicate that a file was added to a storage device, that a number of users of an application exceeds a threshold on the number of users, or that an amount of available memory falls below a threshold. Events may include data such as an event type, application identifier, event time, severity level, event identifier, etc. Although the term "events" is used herein, other literature may refer to similar concepts as "messages," "notifications," or other like terms.

Overview

If an event management system or component within an event management system fails, events generated by systems and applications monitored by the event management system may not be processed or analyzed. As a result, the performance and health of the systems and applications may be unknown. To reduce the impact of a failure, an event management system may include at least two event managers: a primary event manager and one or more standby event managers. The standby event managers are configured to handle event processing tasks upon a failure of the primary event manager. To be prepared for a failure of the primary event manager, the standby event manager receives state data and copies of events. When the primary event manager requests a batch of events from an event communication bus, the event communication bus sends the batch of events to the primary event manager and sends a copy of the batch of events to the standby event manager. After processing the batch of events (or a subset thereof), the primary event manager synchronizes state data with the standby event manager. After determining that the primary event manager has failed, the standby event manager can begin processing events. Because the standby event manager has the state data, the standby event manager does not reprocess events that were already processed by the primary event manager. Instead, the standby event manager processes the unprocessed events in a batch and updates its copy of the state data based on the processing of the events. The standby event manager continues processing events until determining that the primary event manager is operational. Once the primary event manager is operational, the standby event manager can synchronize its state data with the primary event manager.

Example Illustrations

FIG. 1 depicts an example fault tolerant event management system including a primary event manager that synchronizes state data with a standby event manager. FIG. 1 depicts a primary event manager 105 and a standby event manager 106 communicatively coupled to an event communication bus 102. FIG. 1 also depicts components 101A, 101B, and 101C communicatively coupled with the event communication bus 102. Components 101A, 101B, and 101C (collectively "the components") may be computing systems, switches, storage devices, virtual machines, applications, application components, etc. As indicated by the ellipses, additional components may be communicatively coupled to the event communication bus 102. The event communication bus 102 is used as a central communication channel for events and other communications between components communicatively coupled to the event communication bus 102.

At stage A, one or more of the components generate events and send the events to the event communication bus 102. Events may be generated by agents or probes on the components, hardware or software modules of the components, etc. The components may send generated events to the event communication bus 102 through a designated interface or port using a particular communication protocol. For example, a component may send an event as a Hypertext Transfer Protocol ("HTTP") message though a port reserved for event communication. The event communication bus 102 may include a component that receives and stores events in a buffer, such as a first-in-first-out ("FIFO") buffer, located in memory or on a storage device. The event communication bus 102 retains received events until they are read by an event manager, such as the primary event manager 105 and/or the standby event manager 106, or other component.

At stage B1, the primary event manager 105 reads a batch of events 103A (hereinafter "events 103A") from the event communication bus 102. The primary event manager 105 reads the events 103A from the event communication bus 102 in the order or sequence in which they were received from the components. To read the events 103A, the primary event manager 105 can request that the event communication bus 102 send a particular number of events to the primary event manager 105. The primary event manager 105 may send the request in accordance with an application programming interface ("API") implemented by the event communication bus 102, which may include sending the request via a particular communication protocol, such as HTTP. The batch size of the events 103A can be configured. For example, the batch size can be 1,000 events or fifty events. The batch size may vary based on system capability or performance, the total number of events being generated, etc. In some implementations, the event communication bus 102 stores the events in a buffer, and the event manager 105 may read the events 103A from the event communication bus 102 by reading the events 103A directly from a storage location corresponding to the buffer.

At stage B2, the standby event manager 106 reads a batch of events 103B (hereinafter "events 103B") from the event communication bus 102. The events 103B are a copy of the events 103A. The standby event manager 106 can be configured to automatically read a next batch of events after receiving state data from the primary event manager 105, as described at stage D, or after receiving a notification from the primary event manager 105. In some implementations, the event communication bus 102 is configured to send a copy of the events 103A (i.e. events 103B) to the standby event manager 106 in response to the primary event manager 105 reading the events.

At stage C, the primary event manager 105 processes the events 103A. The events 103A are analyzed and processed according to a specific set of directives or rules that indicate actions to perform based on an event. For example, in response to receiving an event, the primary event manager 105 may create a log, send an email, execute a script or command, route or forward an event, create an alarm, etc. The primary event manager 105 may also send one or more of the events 103A to other modules for processing.

The primary event manager 105 maintains state data generated as a result of processing the events 103A. State data may include the number of events processed, the state of active alarms, alarm severity, event counters, performance metrics, etc. The state data may affect the outcome of processing an event. For example, a processing rule may indicate that if an event occurs four times within a ten minute window then an alarm should be generated for the event. In order to track the frequency of an event, the primary event manager 105 records the number of times an event has occurred within a specific time window in the state data. If the state data indicates that the event has been received a fourth time in a ten minute window, then the primary event manager 105 will generate an alarm as part of processing the event and update the state data to indicate that the alarm was generated. Similarly, the primary event manager 105 may update the status of active alarms based on received events. For example, if an alarm was generated based on a particular condition (e.g., low available memory), the primary event manager 105 may remove the alarm after receiving an event indicating that the particular condition has changed. Some events may be enhanced or modified to include additional information derived from state data. For example, before forwarding an event to an alarm manager, a severity associated with the event may be increased based on the number of times the event has been received and the state data may be updated to reflect the change. The primary event manager 105 can maintain state data in memory, on a local or remote storage device, etc.

At stage D, the primary event manager 105 synchronizes state data 107 with the standby event manager 106. The primary event manager 105 can synchronize the state data 107 after processing the events 103A or after processing a subset of the events 103A. For example, the primary event manager 105 might synchronize the state data 107 after processing every ten events of the events 103A. The primary event manager 105 may send the state data 107 to the standby event manager 106 via an API. For example, the primary event manager 105 may send the state data as one or more HTTP packets formatted in accordance with the API. The primary event manager 105 may send the state data 107 to the standby event manager 106 without using an API. For example, the primary event manager 105 may transfer or write the state data 107 to a storage location associated with the standby event manager 106. In some implementations, the primary event manager 105 notifies the standby event manager 106 that the events 103A have been processed. Upon receiving the notification, the standby event manager 106 reads the state data 107 from a storage location associated with the primary event manager 105.

At stage E, the standby event manager 106 determines whether the primary event manager 105 has failed. To determine if the primary event manager 105 has failed, the standby event manager 106 can periodically ping the primary event manager 105 and check for a response or can determine that a particular period of time has passed without receiving a communication from the primary event manager 105. The standby event manager 106 may also determine that the primary event manager 105 has failed in response to receiving a notification. For example, the primary event manager 105 may be monitored by a performance monitoring unit or other component (not depicted) that monitors the performance and health of the primary event manager 105. The performance monitoring unit may send a notification to the standby event manager 106 after the performance monitoring unit determines that the primary event manager 105 has failed.

The operation depicted at stages F-H are performed if the standby event manager 106 determined, at stage E, that the primary event manager 105 has failed. If the standby event manager 106 does not determine that the primary event manager 105 has failed, the operations depicted at stages F-H are not performed (as indicated by the dashed lines). It is assumed that the primary event manager 105 failed before processing all of the events 103A.

At stage F, the standby event manager 106 analyzes its state data to determine if any state data for the events 103A was received prior to failure of the primary event manager 105. If the standby event manager 106 did not receive any state data for the events 103A, the standby event manager 106 begins processing with the first event of the events 103B. As a result, the standby event manager 106 may reprocess events that were already processed by the primary event manager 105. If the standby event manager 105 received state data for a subset of the events 103A, the standby event manager 106 begins processing the events 103B with the next unprocessed event, i.e. the next event for which it does not have state data. For example, if the primary event manager 105 synchronized its state data after processing fifty events, the standby event manager 106 begins processing the events 103B with the fifty-first event. To determine for which of the events 103B the standby event manager 106 has state data, the standby event manager 106 may compare event identifiers associated with the events 103B to event identifiers logged in the state data. Additionally, the standby event manager 106 may identify the most recently processed event indicated in the state data and select the next sequential event in the events 103B.

At stage G, the standby event manager 106 processes the events 103B. The standby event manager 106 can process the events 103B in a manner similar to that used by primary event manager 105 to process the events 103A at stage C.

At stage H, the standby event manager 106 determines whether the primary event manager 105 is operational. To determine if the primary event manager 105 is operational, the standby event manager 106 may ping the primary event manager 105. If the primary event manager 105 is monitored by a performance monitoring unit or other component, the standby event manager 105 may receive a notification indicating that the primary event manager 105 is operational.

The operations of stage I are performed if the standby event manager 106 determines at stage H that the primary event manager 105 is operational. At stage I, the standby event manager 106 synchronizes the state data 108 with the primary event manager 105. The standby event manager 106 can synchronize the state data 108 in a manner similar to that used by primary event manager 105 to synchronize the state data at stage D.

In some implementations, the state data 108 may be synchronized even if the primary event manager 105 is not operational. For example, the primary event manager 105 and the standby event manager 106 may have access to shared storage or memory. In such implementations, the standby event manager 106 may write the state data to the shared storage or memory. Thus, if the primary event manager 105 becomes operational again, the primary event manager 105 may have access to the most recent state data.

After stages A and B, both the primary event manager 105 and the standby event manager 106 have received the same events (events 103A and events 103B). Thus, both the primary event manager 105 and the standby event manager 106 are ready to process their respective copies of the events. However, the standby event manager 106 does not process the events 103B unless it determines that the events 103A were not processed. In the event that the standby event manager 106 determines that the events 103A were successfully processed (e.g., after receiving the state data 107), the standby event manager 106 can discard the events 103B.

The description above assumes that the state data was synchronized between the primary event manager 105 and the standby event manager 106 prior to beginning the operations described above. An initial synchronization of state data may occur in a number of ways. For example, after an initial startup, the primary event manager 105 may perform a complete backup of state data to the standby event manager 106. By performing a backup, the primary event manager 105 may replace the state data, if any, of the standby event manager 106. The primary event manager 105 may also perform a backup periodically, after network resets, etc., to ensure the state data is properly synchronized. After the backup, the primary event manager 105 may then synchronize changes to state data as described above. In some instances (e.g., if the primary event manager 105 and the standby event manager 106 are initialized together), no initial synchronization of state data may occur.

Figure 2:
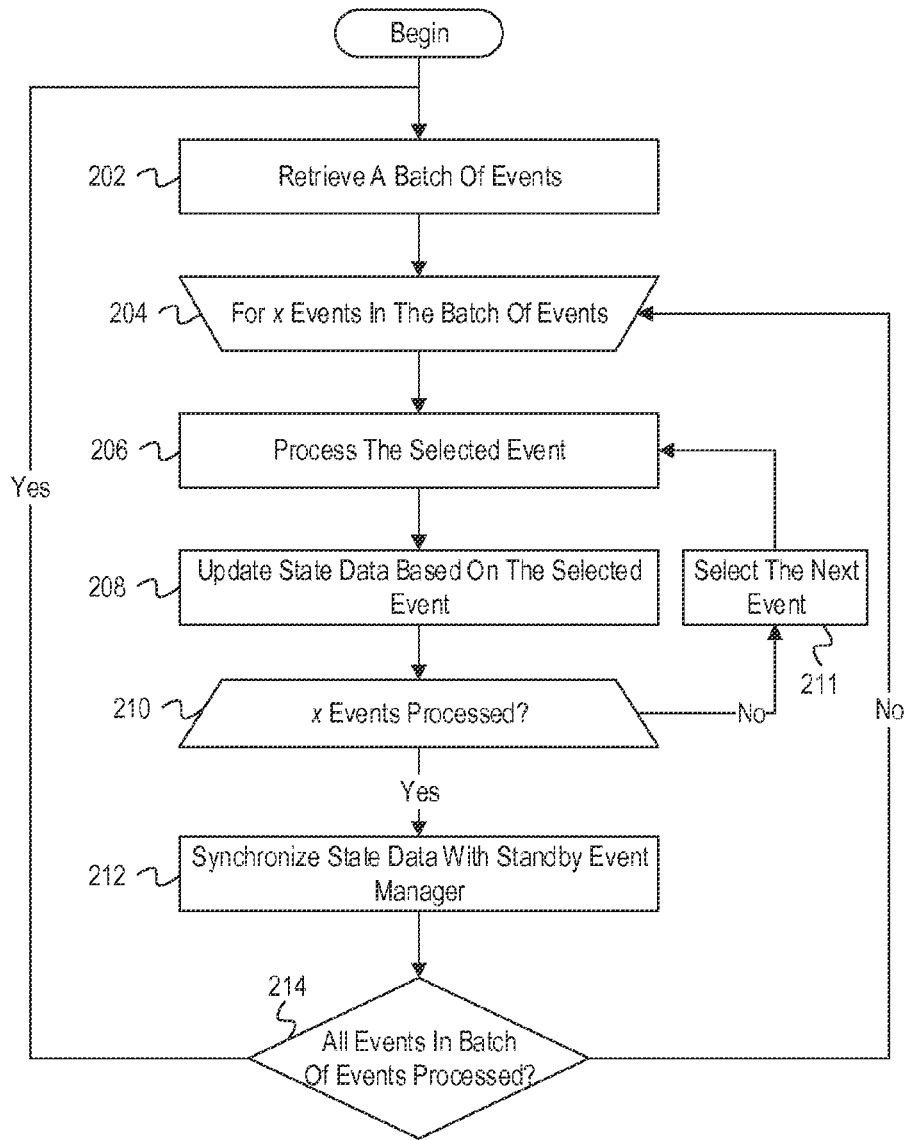
FIG. 2 depicts a flow diagram of example operations for a primary event manager.

FIG. 2 depicts a flow diagram of example operations for processing events and synchronizing state data. The operations described in FIG. 2 may be performed by an event manager, such as the primary event manager 105 depicted in FIG. 1, or any suitable component.

A primary event manager retrieves a batch of events from an event communication bus (202). The event communication bus may be a software module communicatively coupled to a storage system or database that includes indications of events. The primary event manager may request or retrieve a batch of events in accordance with an API. The batch size (number of events in a batch) may vary based on a configuration or performance limitations of the primary event manager. The primary event manager may retrieve events from the event communication bus in a FIFO order. In some instances, the event communication bus may not have any events or enough events to equal a batch size. In such instances, the event communication bus may wait until enough events have been received to equal a batch before sending the events. Alternatively, the event communication bus may send what events it has, if any.

An event processing loop for x events in the batch of events begins (204). The variable x is a configurable value that controls the number of events that are processed before the primary event manager synchronizes state data with a standby event manager. The value of the variable x may vary based, at least in part, on the time needed to synchronize state data, performance requirements, etc. The value of the variable x may also change in relation to batch size. For example, the value of the variable x may be set to be equal to the batch size, one-half of the batch size, one-third of the batch size, etc. In some implementations, the primary event manager may be statically configured to loop over the entire batch. In such implementations, x may be an implicit value based on the batch size. The event currently being iterated over is hereinafter referred to as "the selected event."

The primary event manager processes the selected event (206). The primary event manager processes the selected event according to rules or a configuration of the primary event manager. As part of processing the event, the primary event manager may perform an action indicated by a rule such as distribute the selected event to a network monitoring application, trigger an alert for the selected event, assign the selected event to an administrator, etc.

The primary event manager updates state data based on the selected event (208). The selected event may affect the state data in a variety of ways. For example, the primary event manager may increment a counter in the state data to indicate an additional occurrence of the selected event, indicate in the state data that an alarm was generated for the selected event, write an identifier for the event to a log in the state data, etc.

The primary event manager determines whether x events have been processed (210). If x events have not been processed, then the next event in the batch of events is selected (211). If x events have been processed or there are no additional events in the batch, then the event processing loop (204) exits.

After the event processing loop exits, the primary event manager synchronizes state data with a standby event manager (212). The state data represents the state of the event processing after processing the x events of the batch of events. The primary event manager may send state data to the standby event manager according to a communication protocol, such as HTTP or FTP, or may write state data directly to a storage device or memory of the standby event manager 106. The primary event manager may also synchronize the state data using techniques for backing up data such as incremental backups, differential backups, mirror backups, etc.

The primary event manager determines whether all events in the batch of events have been processed (214). If all events in the batch of events have not been processed, the event processing loop (204) begins for the next x events of the batch of events. If all events in the batch of events have been processed, the primary event manager retrieves another batch of events from the event communication bus (202).

In some implementations, some of the events in a batch of events may be discarded after minimal processing, thereby decreasing the number of events to be fully processed. For example, events from a known problematic component may be discarded after the source of the event is identified, or an event may be discarded after correlation with a duplicate event. Minimal processing may also include processing sufficient to identify the event, log the event, or otherwise determine that the event may be discarded.

Figure 3:
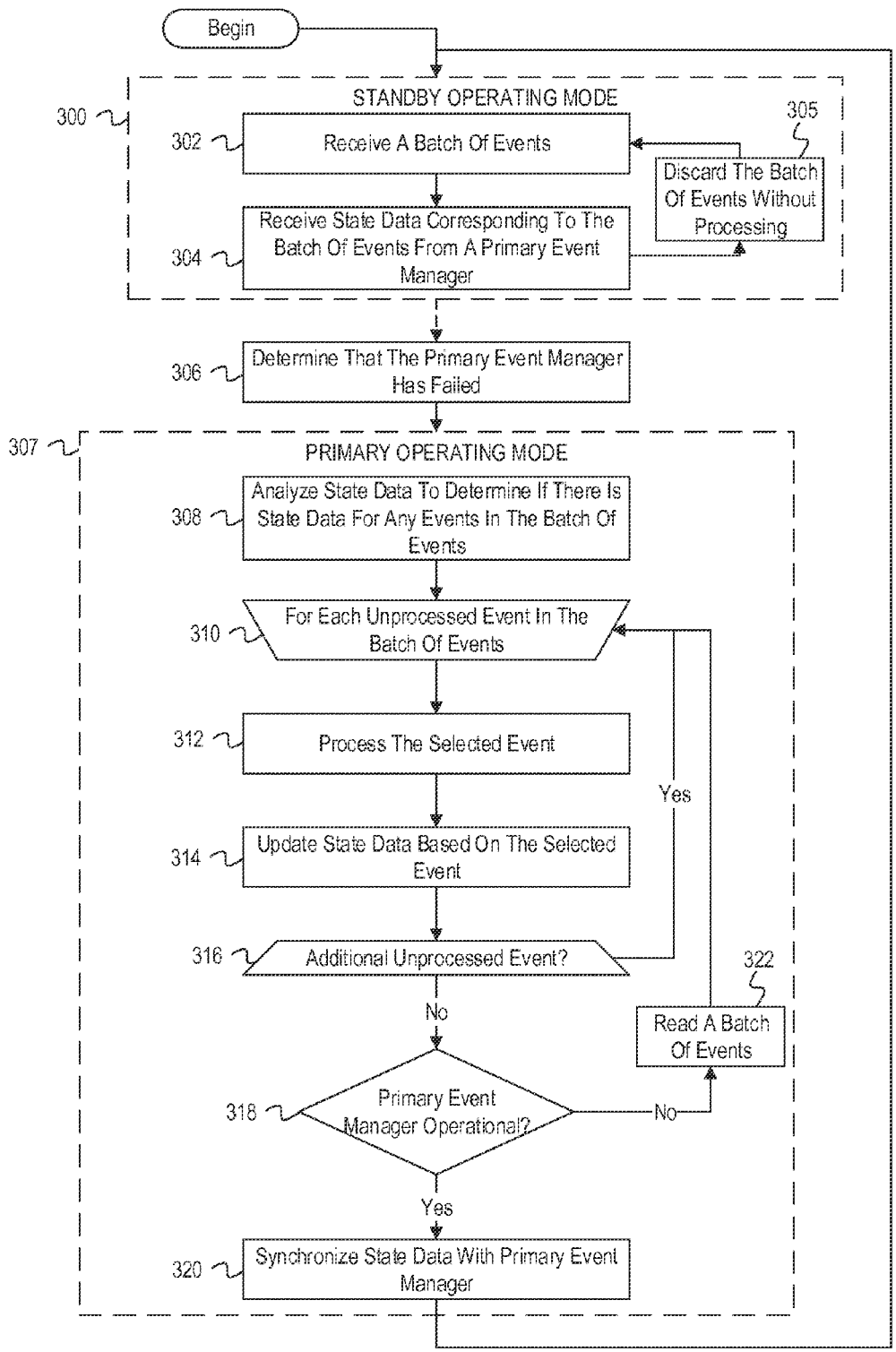
FIG. 3 depicts a flow diagram of example operations for a standby event manager.

FIG. 3 depicts a flow diagram of example operations for processing events upon a failure of a primary event manager. The operations described in FIG. 3 may be performed by an event manager, such as the standby event manager 106 depicted in FIG. 1, or any suitable component. FIG. 3 depicts example operations for a standby operating mode 300 and a primary operating mode 307.

The standby operating mode 300 includes operations 302, 304, and 305. The operations of the standby operating mode 300 occur while a primary event manager is operational. As indicated by the arrow that returns control to block 302 from block 305, the operations of the standby operating mode 300 repeat as long as the primary event manager remains operational.

The standby event manager receives a batch of events from an event communication bus (302). The batch of events is a copy of a batch of events retrieved by a primary event manager. In some implementations, the event communication bus is configured to send the batch of events to the standby event manager in response to a batch of events being read by a primary event manager. In some implementations, the standby event manager may send a read request for the batch of events to the event communication bus in response to receiving a notification from the primary event manager. For example, the standby event manager may receive state data from a primary event manager for a particular batch of events. Reception of the state data can serve as the notification that the batch of events should be requested. Upon receiving the batch of events, the standby event manager may perform preliminary processing of the batch of events, such as parsing the batch of events, maintaining a count of the number of events, or loading the batch of events into an array; however, the preliminary processing is not as extensive as the processing of the batch of events performed by the primary event manager or performed by the standby event manager when operating in the primary operating mode 307.

The standby event manager receives state data corresponding to the batch of events from a primary event manager (304). Since the primary event manager is operational, the primary event manager processes the batch of events, generates state data based on the processed events, and sends the generated state data to the standby event manager. In some implementations, the primary event manager may incrementally synchronize state data based on subsets of the batch of events. For example, the primary event manager may synchronize state data after every fifty events are processed if the batch size is 500 events.

Once state data for the entire batch of events is received from the primary event manager, the standby event manager discards the batch of events without processing (305). Because the standby event manager received state data for the batch of events from the primary event manager, the standby event manager does not process the batch of events in order to generate state data or modify the state data received from the primary event manger. As a result, the batch of events may be discarded in preparation for receiving a next batch of events. The batch of events may be discarded by freeing the memory used by the batch of events or flushing the batch of events from a buffer. The events can be discarded at various points in time depending on the standby event manager implementation. For example, in some implementations, the standby event manager discards the events based on determining that the batch of events has been processed by the primary event manager (as illustrated in FIG. 3). In some implementations, the standby event manager discards the batch of events in response to receiving another batch of events (302).

The standby event manager determines that the primary event manager has failed (306). The mechanism by which the standby event manager determines that the primary event manager has failed may vary. For example, the standby event manager may determine that the primary event manager has failed based on receiving a notification from another module that monitors the health of the primary event manager. As another example, the standby event manager may determine that the primary event manager has failed if a period of time has elapsed since last receiving state data or any other communication from the primary event manager. In response to determining that the primary event manager has failed, the standby event manager stops performing the operations of the standby operating mode 300. Instead, the standby event manager begins performing the operations of the primary operating mode 307. The primary operating mode 307 includes operations 308-322.

The standby event manager analyzes state data to determine if it has state data for any events in the most recently received batch of events (308). As described in FIG. 2, a primary event manager may synchronize state data after every x events that have been processed. As a result, the standby event manager may have state data for a subset of the batch of events and will not reprocess the subset of events. For example, assume that the batch size is 500 events. The state data may only encompass 100 of the 500 events. The standby event manager can identify the 100 events included in the state data and, as described below, will process the 400 unprocessed events. If the primary event manager synchronizes state data after processing an entire batch, the primary event manager would not have synchronized the state data associated with the batch of events that was being processed when the primary event manager fails (e.g., the batch of events that corresponds to the last batch of events received at block 302). Thus, the standby event manager may not have state data for any of the events in the batch and can skip analyzing the state data prior to processing events.

A loop for each unprocessed event in the batch of events begins (310). The loop begins with the first event for which the standby event manager does not have state data. If the standby event manager does not have state data for an event, the standby event manager assumes the event is unprocessed. The event currently being iterated over is hereinafter referred to as "the selected event."

The standby event manager processes the selected event (312) and updates the state data based on the selected event (314). The standby event manager can process the event and update the state data in a manner similar to the primary event manager as described at process blocks 206 and 208 of FIG. 2.

The standby event manager determines whether there is at least one additional unprocessed event (316). If there is at least one additional unprocessed event, the next event in the batch of events is selected (310).

If there is not at least one additional unprocessed event, the standby event manager determines whether the primary event manager is operational (318). The standby event manager may determine whether the primary event manager is operational after receiving a notification indicating that the primary event manager is operational, by successfully communicating with the primary event manager, etc.

If the primary event manager is not operational, the standby event manager reads another batch of events from the event communication bus (322). The standby event manager can read a batch of events from the event communication bus in a manner similar to that of the primary event manager described at process block 202 of FIG. 2. The size of the batch of events read from the event communication bus may differ from the batch size read by the primary event manager. For example, if the standby event manager is running on hardware with lower performance than the primary event manager, the standby event manager may use a smaller batch size.

If the primary event manager is operational, the standby event manager synchronizes state data with the primary event manager (320). The standby event manager can synchronize state data in a manner similar to that of the primary event manager as described at process block 212 of FIG. 2. The standby event manager synchronizes state data that was generated while the primary event manager was not operational. For example, if the standby event manager processed five batches of events, the standby event manager synchronizes state data including the state data generated from processing the five batches. The standby event manager may also perform a complete backup of state data to the primary event manager.

After synchronizing state data with the operational primary event manager, the standby event manager stops performing the operations of the primary operating mode 307 and resumes the operations of the standby operating mode 300. In some implementations, the standby event manager continues the operations of the primary operating mode 307, even upon the primary event manager becoming operational. In such an implementation, the primary event manager, once it is again operational, begins the operations of the standby operating mode 300. The event managers may switch operating modes again whenever the event manager operating in the primary operating mode 307 fails.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 206 and 208 of FIG. 2 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as events in a batch of events. In some implementations, a batch of events may be iterated over from the oldest event to the newest event or the newest event to the oldest event. In other implementations, a batch of events may be unordered or iterated over based on an order other than time. Also, the number of iterations for loop operations may vary. Different techniques for processing events may require fewer iterations or more iterations. For example, events may be processed in parallel, reducing the number of iterations. Additionally, a loop may not iterate for each event in a batch of events. For example, some events in a batch of events may be correlated prior to loop operations, thereby reducing the total number of events to be fully processed. Events may be correlated or aggregated based on a set of event properties, correlation identifier, event type, etc.

Although a primary event manager is described above as having failed or being non-operational, a failure of a primary event manager can include "constructive" failures, such as when a primary event manager has fallen below a performance threshold or otherwise exhibits degraded performance. For example, a primary event manager may be considered failing if an amount of available memory falls below a specified threshold or if processor utilization is above a specified percentage. Additionally, a failure of a primary event manager can include other scenarios. For example, a primary event manager can be considered failing if it is undergoing maintenance, such as software updates or restarting.

In the description above, a fault tolerant event management system is described as having a single primary event manager and a single standby event manager. In some implementations, there may be multiple primary event managers and multiple standby event managers. For example, one implementation may include a primary event manager and two standby event managers. The primary event manager may synchronize state data with one or both standby event managers. A first of the standby event managers may be designated as a primary standby and be configured to assume the role of primary event manager in the event of a failure of the primary event manager. The second standby event manager then serves as a standby to the first standby event manager.

Some implementations may include two or more primary event managers that operate in parallel or each handle a separate group of components. For example, a first primary event manager may handle events generated by virtual machines while the second primary event manager handles events generated by storage devices. The primary event managers may synchronize state data with each other so that one of the event managers can begin processing all events in the event one of them fails. Additionally, the two primary event managers may each have their own standby event manager or they may share a single standby event manager. In implementations where a single standby event manager is shared, the standby event manager receives state data from both of the primary event managers. Additionally, the standby event manager may receive copies of batches of events being processed by each of the primary event managers. The standby event manager may be configured to assume the role of the first primary event manager to fail, or in the event both primary event managers fail, the standby event manager may be configured to handle event processing for both primary event managers simultaneously or to switch between batches of events that would be processed by the respective primary event managers.

In the description above, a primary event manager synchronizes state data with a standby primary event manager after processing a batch of events or after processing an x number of events in a batch. A primary event manager may also be configured to synchronize state data periodically, after expiration of a time period, or after a certain amount of state data has been generated. For example, a primary event manager may synchronize state data after generating one hundred megabytes of state data.

Additionally, in the description above, a standby event manager begins processing events after a primary event manager has failed. A standby event manager may also be configured to begin processing events at a scheduled time. For example, if a primary event manager is scheduled for maintenance, a standby event manager may assume event processing tasks during the maintenance period.

In FIG. 3, the standby event manager is depicted as determining whether the primary event manager is operational (318) after finishing the processing of a batch of events. However, the standby event manager may determine that the primary event manager is operational during the processing operations. In some instances, the standby event manager may determine that the primary event manager is operational prior to completing processing of a batch and may synchronize state data prior to the completing the processing of the batch. In such an instance, the standby event manager may halt processing events to allow the primary event manager to begin processing events after the synchronization of state data. In other instances, even if the standby event manager determines that the primary event manager is operational prior to completing processing of a batch, the standby event manager may still complete processing of the batch before synchronizing state data.

The variations described above do not encompass all possible variations, implementations, or embodiments of the present disclosure. Other variations, modifications, additions, and improvements are possible.

FIG. 1 is annotated with a series of letters A-H. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
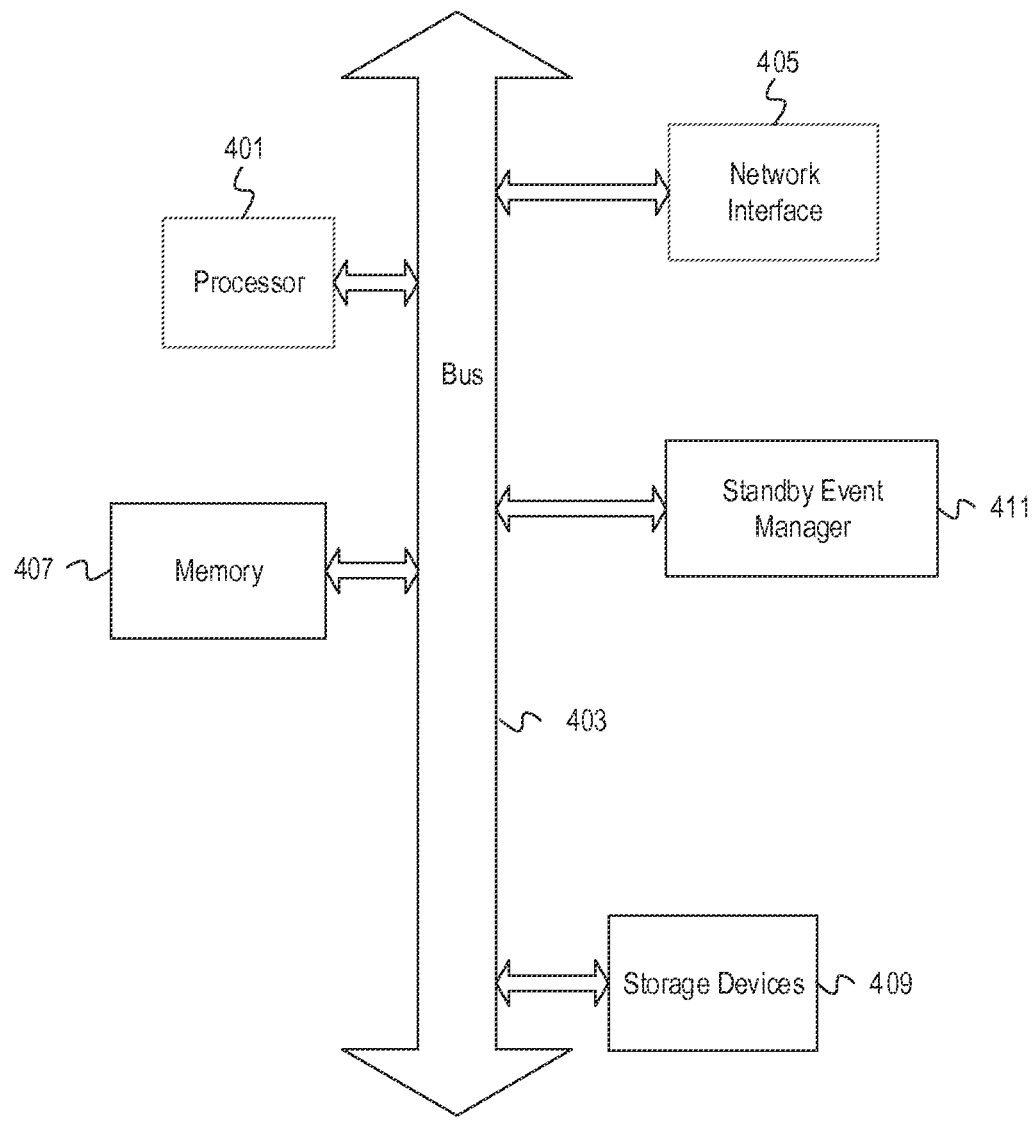
FIG. 4 depicts an example computer system with a fault tolerant event management system.

FIG. 4 depicts an example computer system with a standby event manager. The computer system includes a processor 401 (possibly including multiple processors, multiple cores, multiple nodes, and/or implementing multithreading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes storage devices 409. The storage devices 409 may be local or remote storage (e.g., a hard disk or hard disk array, a diskette, an optical storage device, a magnetic storage device, Network Attached Storage (NAS), Storage Area Network (SAN)) or any one or more of the above already described possible realizations of machine-readable media. The computer system also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The system also includes a standby event manager 411. The standby event manager 411 receives state data corresponding to one or more events from a primary event manager. If the standby event manager 411 determines that the primary event manager has failed, the standby event manager 411 identifies which events were not processed by the primary event manager and begins processing events. If the primary event manager becomes operational again, the standby event manager 411 can synchronize the updated state data with the primary event manager and allow the primary event manager to begin processing events again. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for providing a fault tolerant event management system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
   receiving a first batch of events into a first buffer of a first event manager and receiving the first batch of events into a second buffer of a second event manager, wherein the first batch of events are received into the first buffer from a communication bus which receives events from a plurality of components of a network;
   communicating, by the first event manager to the second event manager, first state data that at least indicates state of processing of the first batch of events by the first event manager;
   based on indication of the first state data from the first event manager to the second event manager,
     the first event manager discarding the first batch of events from the first buffer;
     without processing the first batch of events, the second event manager discarding the first batch of events from the second buffer; and
     receiving a second batch of events into the first buffer of the first event manager from the communication bus and receiving the second batch of events into the second buffer of the second event manager;
   determining, by the second event manager, that the first event manager is not operational; and
   based on determining that the first event manager is not operational,
     processing, by the second event manager, the second batch of events from the second buffer based, at least in part, on the first state data; and
     updating, by the second event manager, the first state data based, at least in part, on processing the second batch of events.

2. The method of claim 1, wherein receiving the first batch of events into the first buffer of the first event manager and receiving the first batch of events into the second buffer of the second event manager comprises:
   requesting, by the first event manager, the first batch of the events from the communication bus;
   communicating, by the first event manager to the second event manager, a notification to request the first batch of events from the communication bus; and
   based on receiving the notification, requesting, by the second event manager, the first batch of events from the communication bus.

3. The method of claim 1, wherein the communication bus sends the first batch of events to the second event manager in response to a request for the first batch of events from the first event manager.

4. The method of claim 1 further comprising:
   determining, by the second event manager, that the first event manager is operational; and
   based on determining that the first event manager is operational, sending, by the second event manager, the updated first state data to the first event manager.

5. The method of claim 4, wherein determining that the first event manager is not operational comprises receiving a notification that the first event manager is not operational, wherein determining that the first event manager is operational comprises receiving a notification that the first event manager is operational.

6. The method of claim 1 further comprising:
   determining, by a monitoring component, that performance of the first event manager meets a criterion; and
   based on determining that the performance of the first event manager meets the criterion, indicating that the first event manager is not operational.

7. The method of claim 6, wherein the second event manager is the monitoring component.

8. The method of claim 1 further comprising:
   receiving, by the second event manager, second state data, wherein the second state data is generated by the first event manager based, at least in part, on the first event manager processing a subset of the second batch of events; and
   based on determining that the first event manager is not operational,
     identifying, by the second event manager, a set of unprocessed events and a set of processed events based, at least in part, on second state data, wherein the second batch of events comprises the set of unprocessed events and the set of processed events, wherein the set of processed events corresponds to the subset of the second batch of events;
     wherein processing the second batch of events from the second buffer comprises processing the set of unprocessed events and not processing the set of processed events.

9. The method of claim 8, wherein identifying the set of processed events comprises comparing a plurality of event identifiers of the second batch of events to a plurality of event identifiers that comprise the second state data.

10. The method of claim 1 further comprising performing an initial synchronization of state data between the first event manager and the second event manager.

11. One or more non-transitory machine-readable media having program code for a first event manager stored therein, the program code comprising instructions to:
receive a first batch of events into a first buffer of the first event manager from a communication bus which receives events from a plurality of components of a network, wherein the first batch of events is also received in a second buffer of a second event manager;
receive first state data from the second event manager that at least indicates state of processing of the first batch of events from the second buffer of the second event manager;
based on indication of the first state data from the second event manager,
without processing the first batch of events, discard the first batch of events from the first buffer; and
receive a second batch of events in the first buffer from the communication bus, wherein the second batch of event is also received in the second buffer of the second event manager;
determine that the second event manager is not operational; and
based on a determination that the second event manager is not operational,
process the second batch of events from the first buffer based, at least in part, on the first state data; and
update the first state data based, at least in part, on processing the second batch of events.

12. The machine-readable media of claim 11, wherein the instructions to receive the first batch of events into the first buffer from the communication bus comprise instructions to:
receive a notification from the second event manager to request the first batch of events from the communication bus; and
based on receipt of the notification, request the first batch of events from the communication bus.

13. An apparatus comprising:
a processor; and
a machine-readable medium having program code executable by the processor to cause the apparatus to:
receive a first batch of events into a first buffer of the apparatus from a communication bus which receives events from a plurality of components of a network, wherein the first batch of events is also received in a second buffer of an event manager;
receive first state data from the event manager that at least indicates state of processing of the first batch of events from the second buffer of the event manager;
based on indication of the first state data from the event manager,
without processing the first batch of events, discard the first batch of events from the first buffer; and
receive a second batch of events in the first buffer from the communication bus, wherein the second batch of events are also received in the second buffer of the event manager;
determine that the event manager is not operational; and
based on a determination that the event manager is not operational,
process the second batch of events from the first buffer based, at least in part, on the first state data; and
update the first state data based, at least in part, on processing the second batch of events.

14. The apparatus of claim 13, wherein the program code executable by the processor to cause the apparatus to receive the first batch of events into the first buffer from the communication bus comprises program code executable by the processor to cause the apparatus to:
receive a notification from the event manager to request the first batch of events from the communication bus; and
based on receipt of the notification, request the first batch of events.

15. The apparatus of claim 13, wherein the communication bus sends the first batch of events in response to a request for the first batch of events from the event manager.

16. The apparatus of claim 13 further comprising program code executable by the processor to cause the apparatus to:
determine that the event manager is operational; and
based on a determination that the event manager is operational, send the updated first state data to the event manager.

17. The apparatus of claim 16, wherein the program code executable by the processor to cause the apparatus to determine that the event manager is not operational comprises program code executable by the processor to cause the apparatus to receive a notification that the event manager is not operational, wherein the program code executable by the processor to cause the apparatus to determine that the event manager is operational comprises program code executable by the processor to cause the apparatus to receive a notification that the event manager is operational.

18. The apparatus of claim 13 further comprising program code executable by the processor to cause the apparatus to:
determine that performance of the event manager meets a criterion; and
based on a determination that the performance of the event manager meets the criterion, indicate that the event manager is not operational.

19. The apparatus of claim 13 further comprising program code executable by the processor to cause the apparatus to:
receive second state data, wherein the second state data is generated by the event manager based, at least in part, on the event manager processing a subset of the second batch of events; and
based on a determination that the event manager is not operational,
identify a set of unprocessed events and a set of processed events based, at least in part, on second state data, wherein the second batch of events comprises the set of unprocessed events and the set of processed events, wherein the set of processed events corresponds to the subset of the second batch of events;
wherein the program code executable by the processor to cause the apparatus to process the second batch of events from the first buffer comprises program code executable by the processor to cause the apparatus to process the set of unprocessed events and not process the set of processed events.

20. The apparatus of claim 19, wherein the program code executable by the processor to cause the apparatus to identify the set of processed events comprises comparing a plurality of event identifiers of the second batch of events to a plurality of event identifiers that comprise the second state data.

\* \* \* \* \*